(12) United States Patent
Kim et al.

(10) Patent No.: US 11,938,849 B2
(45) Date of Patent: Mar. 26, 2024

(54) SEAT FOR VEHICLE HAVING FOLD-AND-DIVE FUNCTION

(71) Applicants: Hyundai Motor Company, Seoul (KR); Kia Corporation, Seoul (KR)

(72) Inventors: Mu Young Kim, Osan-si (KR); Sang Do Park, Suwon-si (KR); Ho Suk Jung, Hwaseong-si (KR); Jun Young Yun, Osan-si (KR); Jun Hwan Lee, Seoul (KR); Chan Ho Jung, Gunpo-si (KR); Hyeok Seung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 222 days.

(21) Appl. No.: 17/454,841

(22) Filed: Nov. 15, 2021

(65) Prior Publication Data
US 2022/0379779 A1 Dec. 1, 2022

(30) Foreign Application Priority Data
May 25, 2021 (KR) .......................... 10-2021-0067160

(51) Int. Cl.
*B60N 2/30* (2006.01)
(52) U.S. Cl.
CPC .......... *B60N 2/3013* (2013.01); *B60N 2/3065* (2013.01)

(58) Field of Classification Search
CPC ............................ B60N 2/3013; B60N 2/3065
See application file for complete search history.

(56) References Cited

U.S. PATENT DOCUMENTS

| | | | | |
|---|---|---|---|---|
| 2012/0139313 A1* | 6/2012 | Sung | .................... | B60N 2/3065 297/341 |
| 2020/0180474 A1* | 6/2020 | Moon | ................... | B60N 2/3065 |
| 2021/0170918 A1* | 6/2021 | Kim | ..................... | B60N 2/3013 |

FOREIGN PATENT DOCUMENTS

| DE | 102008063617 A1 * | 7/2009 | ........... B60N 2/3065 |
|---|---|---|---|
| KR | 20120063383 A | 6/2012 | |

\* cited by examiner

*Primary Examiner* — Anthony D Barfield
(74) *Attorney, Agent, or Firm* — MCDONNELL BOEHNEN HULBERT & BERGHOFF LLP

(57) ABSTRACT

A seat for a vehicle having a fold-and-dive function is proposed. When a seatback is rotated forwards and folded, a seat cushion is moved down, so the fold-and-dive function of the seat is realized. When a full-flat mode is realized by the reclining operation of the seatback, a rear end of the seat cushion is moved up, so a step between the seat cushion and the seatback can be significantly reduced or eliminated. Furthermore, a front link connecting a back cushion interlocking frame and a cushion fixing bracket to perform the fold-and-dive function is installed to have directivity where it is inclined rearwards, thus preventing a submarine phenomenon of the seat in the event of a forward collision.

13 Claims, 9 Drawing Sheets

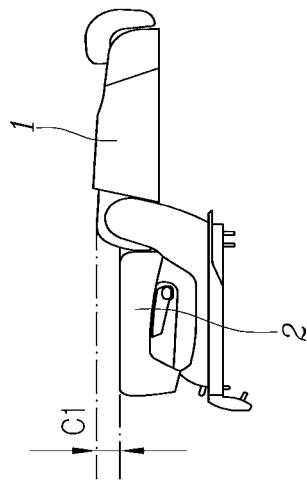
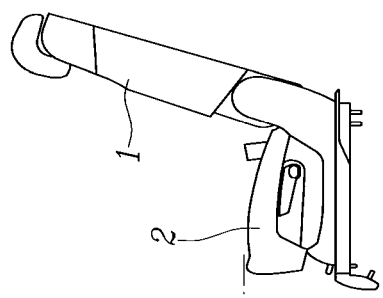
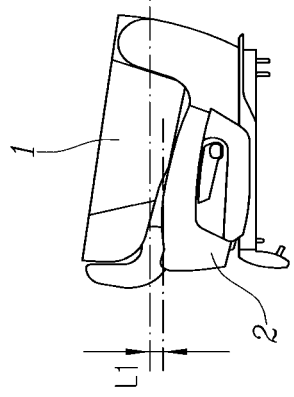
FIG. 7A
FIG. 7B
FIG. 7C

SEAT FOR VEHICLE HAVING FOLD-AND-DIVE FUNCTION

CROSS REFERENCE TO RELATED APPLICATIONS

The present application claims priority to Korean Patent Application No. 10-2021-0067160, filed May 25, 2021, the entire contents of which are incorporated herein for all purposes by this reference.

TECHNICAL FIELD

The present disclosure relates to a seat for a vehicle having a fold-and-dive function. More particularly, the present disclosure relates to a seat for a vehicle having a fold-and-dive function, which allows a rear end of a seat cushion to be lifted upwards when a seatback is reclined while maintaining a dive function, thus being capable of minimizing a step between the seat cushion and the seatback.

BACKGROUND

Generally, a leisure vehicle (RV, SUV, MPV, etc.) is additionally provided with a storage function using an interior space in addition to a passenger boarding function. In order to enhance the availability of the interior space, there are a walk-in function of a seat, a full-flat function of seats present in second and third rows, and a fold-and-dive function of a rear seat.

The fold-and-dive of the rear seat is performed as follows: when a folding operation where the seatback rotates forwards is performed, a dive operation where the seat cushion is moved down is simultaneously performed. The fold-and-dive function increases the space of a luggage room to maximize a space required for loading luggage.

A conventional seat for a vehicle having a fold-and-dive function is problematic in that the position of a seat cushion is not changed in the reclining operation where a seatback rotates backwards, so a large step may occur between the seat cushion and the seatback. Thus, it is difficult to realize the full-flat structure of a rear seat, so a passenger cannot take a rest comfortably.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a seat for a vehicle having a fold-and-dive function, which allows a rear end of a seat cushion to be lifted upwards when a seatback is reclined while maintaining a dive function when the seatback is folded, thus being capable of minimizing a step between the seat cushion and the seatback. Consequently, this enables a full-flat structure of a rear seat, so a passenger can take a comfortable rest. The present disclosure can be particularly applied to an autonomous vehicle that implements a relax mode.

In order to achieve the objective of the present disclosure, the present disclosure provides a seat for a vehicle having a fold-and-dive function, including a back cushion interlocking frame rotatably coupled at a front end and a rear end thereof to a seat cushion front pipe and a seatback side frame, respectively; and a front link rotatably coupled at a front end and a rear end thereof to a front end of the back cushion interlocking frame and a cushion fixing bracket, wherein a hinge joint point at which the seatback side frame and the back cushion interlocking frame are coupled is located under a recliner hinge point that is a rotation center of the seatback side frame.

When the seatback side frame rotates forwards and backwards about the recliner hinge point, the back cushion interlocking frame may be moved in a direction opposite to an upper end of the seatback side frame.

When the back cushion interlocking frame is moved by rotating the seatback side frame, the front link may rotate about a lower-end hinge point coupled to the cushion fixing bracket such that an upper-end hinge point coupled to the back cushion interlocking frame may move in the same direction as the back cushion interlocking frame.

The front link may be installed to have directivity in which an upper end thereof coupled to the back cushion interlocking frame is located behind a lower end thereof coupled to the cushion fixing bracket and thereby the front link is inclined rearwards.

The front link may be installed to have directivity in which the front link is inclined rearwards, thus preventing a submarine phenomenon of the seat in the event of a forward collision.

The front link may be installed to have directivity in which an upper end thereof coupled to the back cushion interlocking frame is located in front of a lower end thereof coupled to the cushion fixing bracket and thereby the front link is inclined forwards.

When the seatback side frame rotates forwards about the recliner hinge point and thereby the seatback is folded, the rear end of the back cushion interlocking frame coupled to the seatback side frame and the front end of the back cushion interlocking frame coupled to the upper end of the front link may be moved backwards and downwards. When the back cushion interlocking frame is moved, the front link may be rotated to be inclined rearwards, thus realizing the fold-and-dive function.

When the seatback side frame rotates rearwards about the recliner hinge point and thereby the seatback is folded, the hinge joint point at which the seatback side frame and the back cushion interlocking frame are coupled may be rotated about the recliner hinge point to move upwards. When the hinge joint point rotates, the rear end of the back cushion interlocking frame may be moved to be lifted upwards. When a full-flat mode of the seat is implemented by upwardly moving the rear end of the back cushion interlocking frame, a step between the seat cushion and the seatback may be reduced.

The seat may further include a recliner base bracket installed to connect a lower end of the seatback side frame and a rear portion of the cushion fixing bracket. A recliner having the recliner hinge point may be installed to be located at a portion where the seatback side frame and the recliner base bracket overlap each other.

The cushion fixing bracket may be coupled to a seat rail.

The seat may further include a seat cushion rear pipe located behind the seat cushion front pipe and coupled at both ends thereof to the back cushion interlocking frame; a suspension pipe located between the seat cushion front pipe and the seat cushion rear pipe, and integrally coupled at both ends thereof to a front end of the back cushion interlocking frame and an end of the seat cushion front pipe; and a plurality of suspensions connecting the seat cushion rear pipe and the suspension pipe.

The seat may further include a recliner operated to forwardly and backwardly rotate the seatback side frame about the recliner hinge point. The recliner may be operated by manipulating a recliner lever, or may be operated with power of a motor by manipulating a power switch.

The seat may further include a tilt mechanism installed to connect the seat cushion front pipe and the cushion fixing bracket. When the tilt mechanism is operated, the seat cushion front pipe may be moved to be lifted upwards, and thereby a relax mode may be realized.

A seat for a vehicle having a fold-and-dive function according to the present disclosure is advantageous in that a seat cushion is moved down when a seatback is rotated forwards and folded, so the fold-and-dive function of the seat is realized, and a rear end of the seat cushion is moved up in a reclining operation where the seatback is rotated backwards, and a step between the seat cushion and the seatback can be significantly reduced or eliminated as a rear end of the seat cushion is moved upwards, so a full-flat mode of the seat can be realized, and thereby a passenger can take a more comfortable rest while lying down.

Furthermore, an embodiment of the present disclosure is advantageous in that a front link connecting a back cushion interlocking frame and a cushion fixing bracket to perform a fold-and-dive function is installed to have directivity where it is inclined rearwards, thus preventing a submarine phenomenon of the seat in the event of a forward collision, and thereby more effectively protecting the safety of a passenger.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 7A is a side view illustrating the seat in a normal sitting state in which a seatback is erected, according to an exemplary embodiment of the present disclosure.

FIG. 7B is a side view illustrating the seat in a state in which a fold-and-dive function is implemented, according to an exemplary embodiment of the present disclosure.

FIG. 7C is a side view illustrating the seat in a state in which a full-flat function is implemented, according to an exemplary embodiment of the present disclosure.

DETAILED DESCRIPTION

Figure 1:
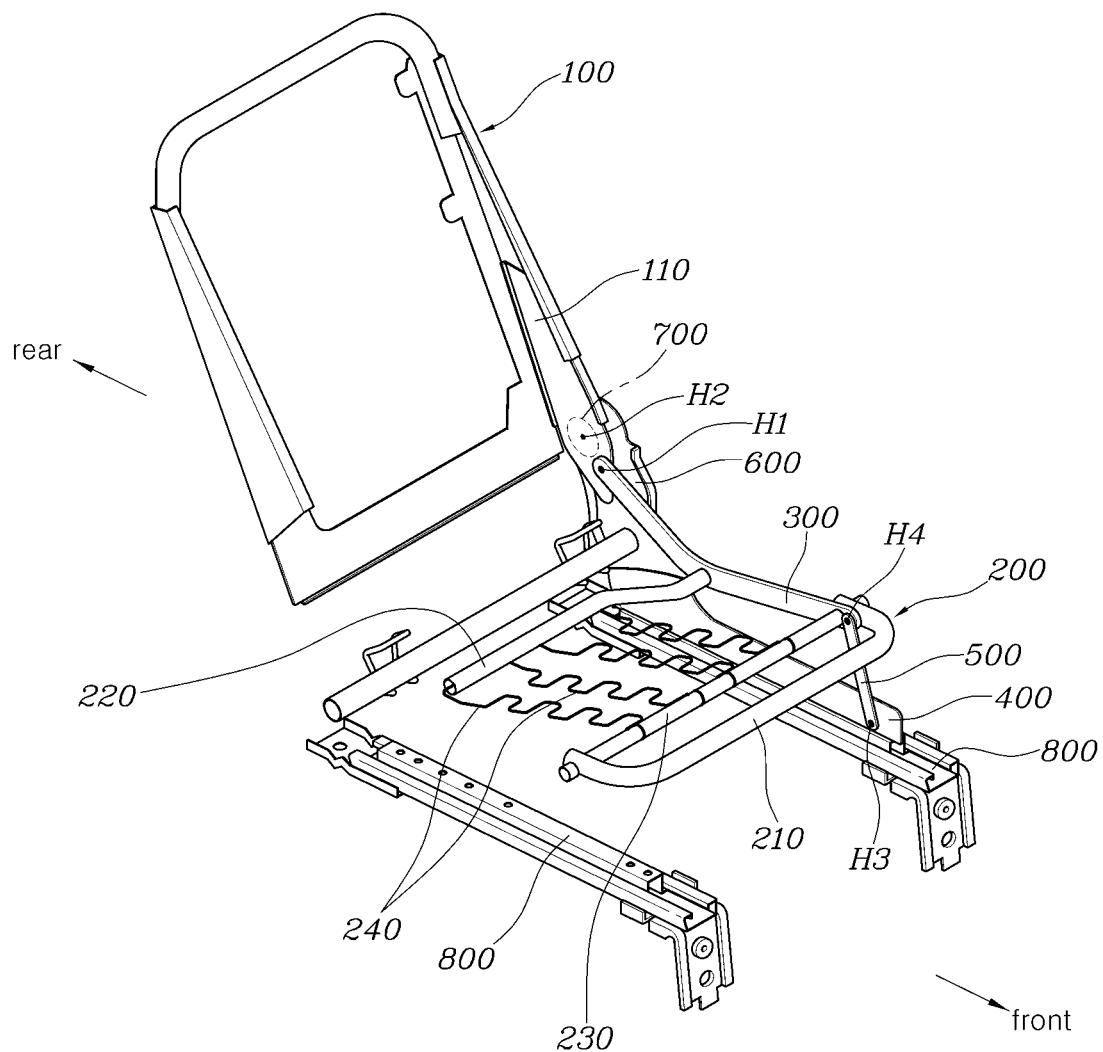
FIG. 1 is a view illustrating a seat for a vehicle having a fold-and-dive function, according to an exemplary embodiment of the present disclosure.

Specific structural or functional descriptions in the embodiments of the present disclosure disclosed in this specification or application are only for description of the embodiments of the present disclosure. The descriptions should not be construed as being limited to the embodiments described in the specification or application.

Since the present disclosure may be embodied in many different forms, particular embodiments will be illustrated in the drawings and be described in detail herein. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

A controller according to an exemplary embodiment of the present disclosure may be implemented through algorithm configured to control the operation of various components of a vehicle or a non-volatile memory (not shown) configured to store data on software command for playing the algorithm, and a processor (not shown) configured to perform an operation, which will be described below, using the data stored in the associated memory. In this regard, the memory and the processor may be implemented as individual chips. Alternatively, the memory and the processor may be implemented as a single incorporated chip. The processor may take the form of one or more processors.

Hereinafter, a seat for a vehicle having a fold-and-dive function according to a preferred embodiment of the present disclosure will be described in detail with reference to the accompanying drawings.

The seat having the fold-and-dive function is usually provided on a rear seat of a leisure vehicle (RV, SUV, MPV, etc.) to maximize a space required for loading luggage into a luggage room.

The seat of the vehicle includes a seatback 1 that supports a passenger's upper body, and a seat cushion 2 that supports the passenger's lower body. A frame of the seatback 1 is formed by a seatback frame 100, and a frame of the seat cushion 2 is formed by a seat-cushion frame 200.

Furthermore, the seat according to the present disclosure is configured such that the dive operation of the seat cushion 2 is simultaneously performed during the folding operation of the seatback 1. To this end, the seat of the present disclosure includes a back cushion interlocking frame 300 that is rotatably coupled at a front end and a rear end thereof to a seat cushion front pipe 210 and a seatback side frame 110, respectively, and a front link 500 that is rotatably coupled at a front end and a rear end thereof to a front end of the back cushion interlocking frame 300 and a cushion fixing bracket 400.

The seatback frame 100 includes a seatback side frame 110, and the seat-cushion frame 200 includes a seat cushion front pipe 210.

Two seatback side frames 110, two back cushion interlocking frames 300, and two front links 500 are symmetrically installed on the left and right sides of the seat, respectively.

A lower end of the seatback side frame 110 and a rear end of the back cushion interlocking frame 300 are rotatably coupled to each other, and the front end of the back cushion interlocking frame 300 and both ends of the seat cushion front pipe 210 are rotatably coupled to each other.

According to an embodiment of the present disclosure, in order to realize the dive function of the seat cushion 2 when the seatback 1 is folded and to realize a function of upwardly lifting the rear end of the seat cushion 2 when the seatback 1 is reclined and thereby minimizing a step between the seat cushion 2 and the seatback 1, a hinge joint point H1 at which the seatback side frame 110 and the back cushion interlocking frame 300 are coupled is located under a recliner hinge point H2 that is a rotation center of the seatback side frame 110, and the front link 500 is installed to have directivity in which the upper end thereof coupled to the back cushion interlocking frame 300 is located behind the lower end thereof coupled to the cushion fixing bracket 400 and thereby the front link is inclined rearwards.

According to an embodiment of the present disclosure, when the seatback side frame 110 rotates forwards and backwards about the recliner hinge point H2, the back cushion interlocking frame 300 may be moved in a direction opposite to the upper end of the seatback side frame 110 to realize the fold-and-dive function and realize the full-flat structure of the seat.

Furthermore, when the back cushion interlocking frame 300 is moved by rotating the seatback side frame 110 forwards and backwards, the front link 500 rotates about a lower-end hinge point H3 coupled to the cushion fixing bracket 400 such that an upper-end hinge point H4 coupled to the back cushion interlocking frame 300 moves in the same direction as the back cushion interlocking frame 300.

The front link 500 according to the present disclosure is installed to have directivity in which the front link is inclined rearwards. Thereby, it is possible to prevent the submarine phenomenon of the seat in the event of the forward collision, thus allowing the safety of a passenger to be more effectively protected.

The conventional front link used to realize the fold-and-dive function is installed to have directivity in which it is inclined forwards. Thereby, this leads to the submarine phenomenon of the seat in the event of the forward collision, and increases the injury of passengers. In contrast, the front link 500 according to the present disclosure is installed to be inclined rearwards. Thereby, it is possible to prevent the submarine phenomenon of the seat in the event of the forward collision, thus allowing the safety of a passenger to be more effectively protected.

Figure 9:
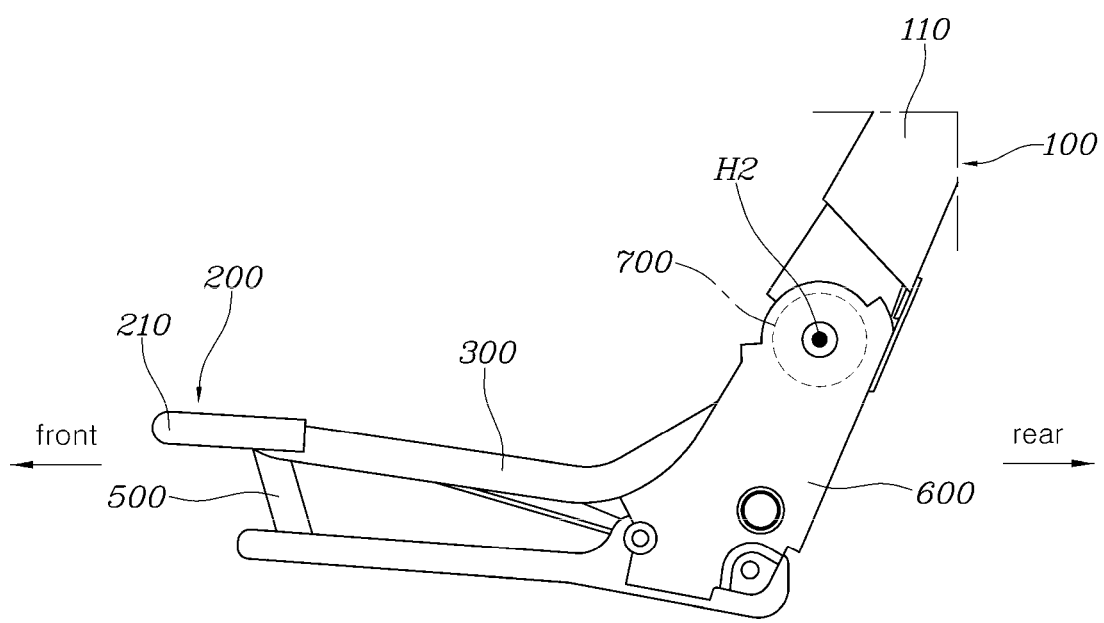
FIG. 9 is a view showing a front link inclined forwards according to an embodiment of the present disclosure.

As shown in FIG. 9, according to an embodiment of the present disclosure, the front link 500 may be installed to have directivity in which the upper end thereof coupled to the back cushion interlocking frame 300 is located in front of the lower end thereof coupled to the cushion fixing bracket 400 and thereby the front link is inclined forwards.

Even if the front link 500 is installed to be inclined forwards, the fold-and-dive function may be realized when the seatback 1 is rotated forwards and folded, and the full-flat mode of the seat may be realized when the seatback 1 performs the reclining operation in which it is rotated rearwards.

Figure 2:
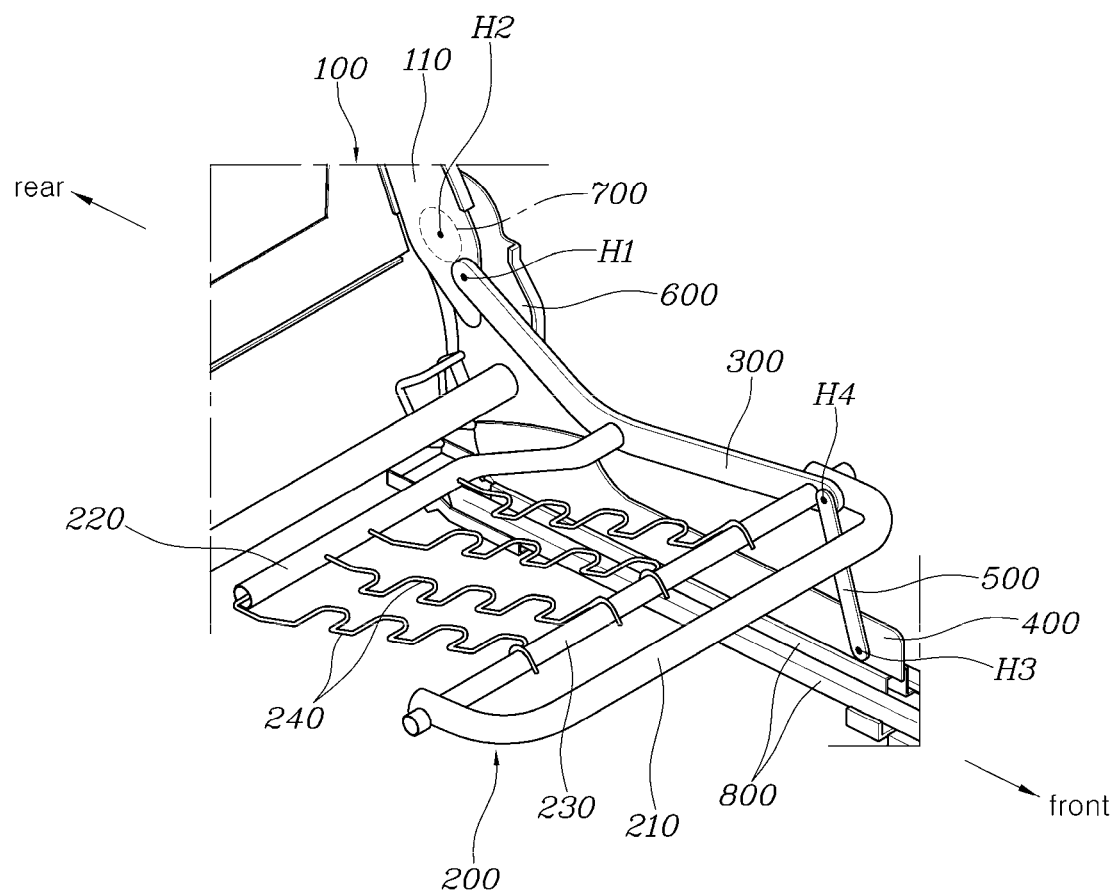
FIG. 2 is an enlarged view of FIG. 1, according to an exemplary embodiment of the present disclosure.
Figure 3:
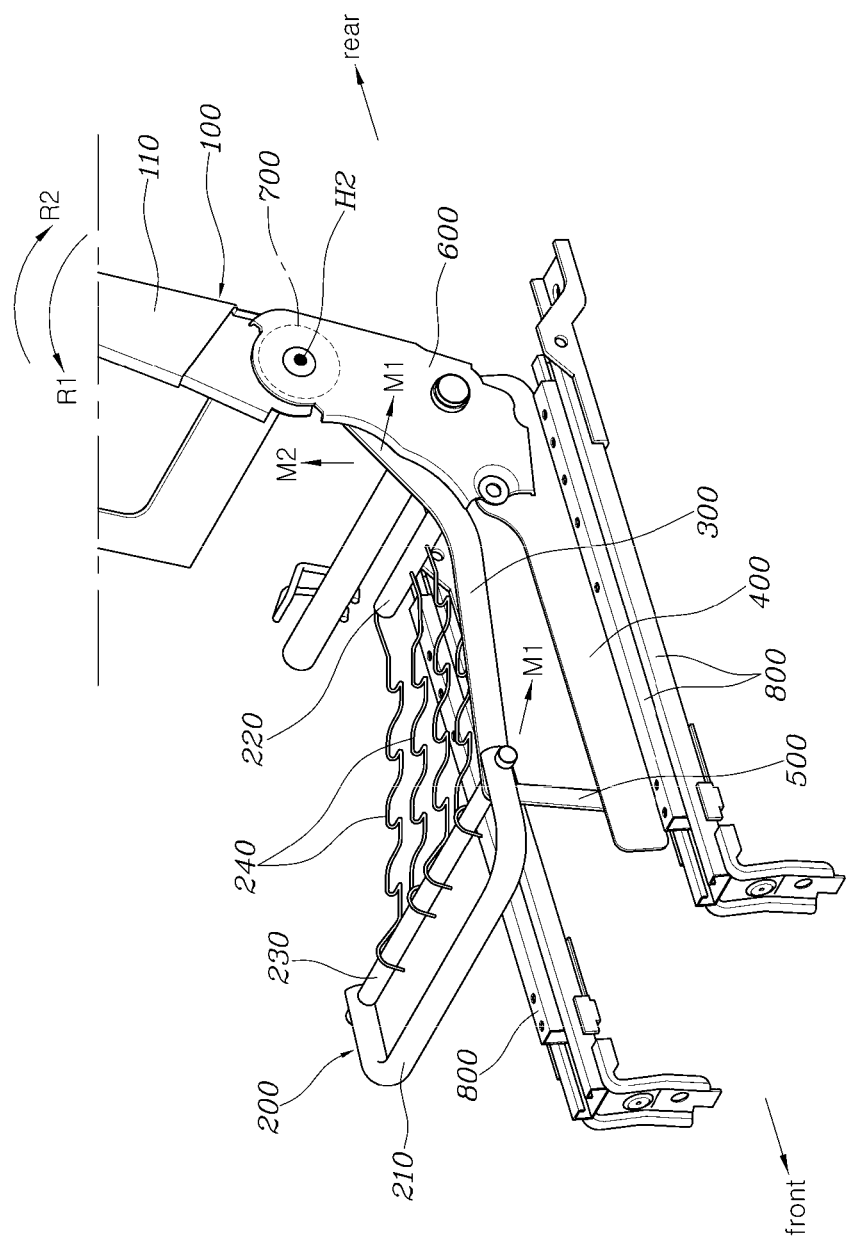
FIG. 3 is a right side view of FIG. 1, according to an exemplary embodiment of the present disclosure.

FIG. 7A illustrates a normal sitting state (the same state as FIGS. 1 to 3) in which the seatback 1 is erected, FIG. 7B illustrates a state in which the fold-and-dive function is implemented In the normal sitting state of FIG. 7A, if the seatback side frame 110 rotates forwards about the recliner hinge point H2 (arrow R1 of FIG. 3), the seatback 1 is folded forwards. When the seatback 1 is folded, the rear end of the back cushion interlocking frame 300 coupled to the seatback side frame 110 and the front end of the back cushion interlocking frame 300 coupled to the upper end of the front link 500 are moved backwards and downwards (arrow M1). When the back cushion interlocking frame 300 is moved backwards and downwards, the front link 500 is rotated to be inclined rearwards. Thus, as the seat cushion 2 is moved down, the fold-and-dive function of the seat is realized.

Since the front link 500 is installed to have directivity in which it is inclined rearwards, the seat cushion 2 may be further moved downwards when the seatback 1 is rotated forwards and folded, and thereby a large dive operation is possible.

Reference numeral L1 of FIG. 7B denotes a distance by which the seat cushion 2 moves down.

FIG. 7C illustrates a state in which the full-flat function of the seat is implemented by the reclining operation of the seatback 1. When the full-flat function is implemented, a passenger may lie down and take a rest.

If the seatback side frame 110 rotates backwards about the recliner hinge point H2 (arrow R2 of FIG. 3) in the normal sitting state of FIG. 7A or in the fold-and-dive state of FIG. 7B, the seatback 1 performs the reclining operation. When the seatback 1 performs the reclining operation, the hinge joint point H1 at which the seatback side frame 110 and the back cushion interlocking frame 300 are coupled is rotated about the recliner hinge point H2 to move upwards. When the hinge joint point H1 rotates, the rear end of the back cushion interlocking frame 300 is moved upwards (arrow M2), and the rear end of the seat cushion 2 is moved upwards by upwardly moving the rear end of the back cushion interlocking frame 300, so the full-flat mode of the seat is finally implemented.

According to the present disclosure, if the rear end of the seat cushion 2 is moved upwards when the full-flat mode of the seat is implemented by the reclining operation of the seatback 1, a step C1 between the seat cushion 2 and the seatback 1 may be significantly reduced or eliminated. Thereby, this enables a passenger to take a more comfortable rest when a passenger lies down.

Figure 8A:
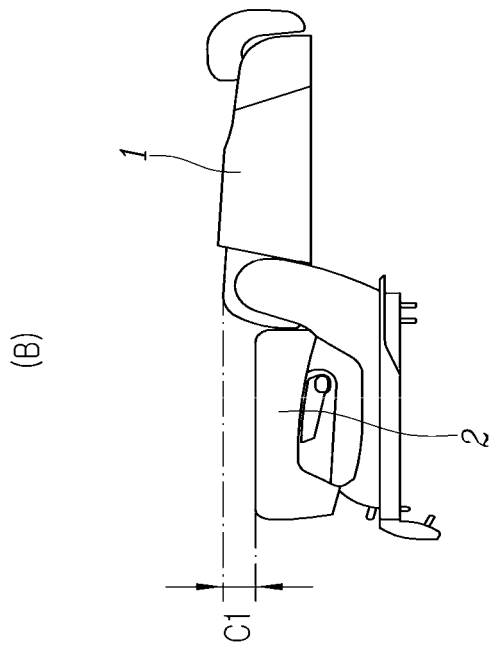
FIG. 8A is a side view illustrating the conventional structure of the seat, according to an exemplary embodiment of the present disclosure.
Figure 8B:
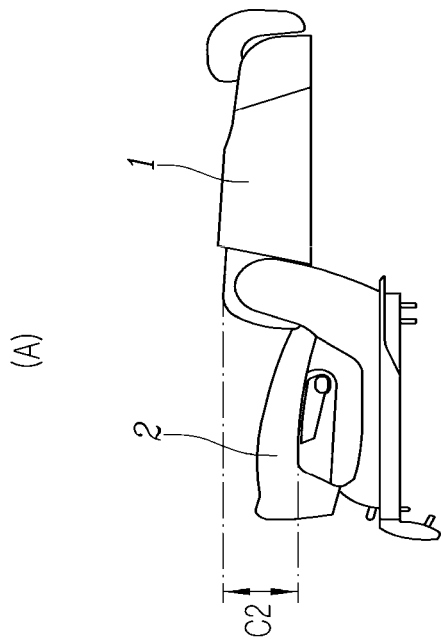
FIG. 8B is a side view illustrating the modified structure of the seat, according to an exemplary embodiment of the present disclosure.

According to the related art, as shown in FIG. 8A, since the position of the seat cushion 2 is not changed in the reclining operation where the seatback 1 rotates backwards, a large step C2 may undesirably occur between the seat cushion 2 and the seatback 1. Thus, it is difficult to realize the full-flat structure of the rear seat, and thereby a passenger cannot take a comfortable rest.

However, according to an embodiment of the present disclosure, the rear end of the seat cushion 2 is moved upwards in the reclining operation of the seatback 1, so the step C1 between the seat cushion 2 and the seatback 1 can be considerably reduced or eliminated as compared to the related art. Therefore, it is advantageous in that a passenger can take a more comfortable rest as compared to the conventional structure.

The seat according to the present disclosure further comprises a recliner base bracket 600 installed to connect the lower end of the seatback side frame 110 and the rear portion of the cushion fixing bracket 400, and is installed so that a recliner 700 having the recliner hinge point H2 is located at a portion where the seatback side frame 110 and the recliner base bracket 600 overlap each other.

Figure 4:
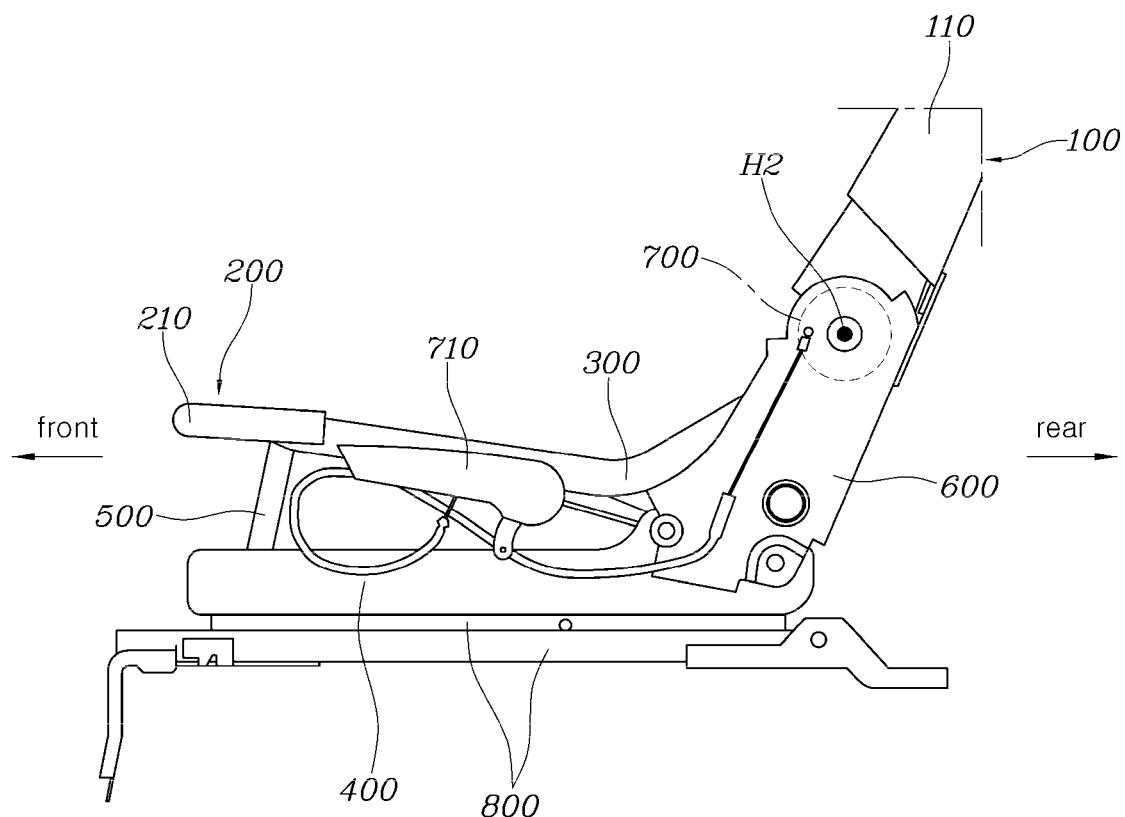
FIG. 4 is a side view of the seat illustrating a recliner lever coupled to the seat, according to an exemplary embodiment of the present disclosure.
Figure 5:
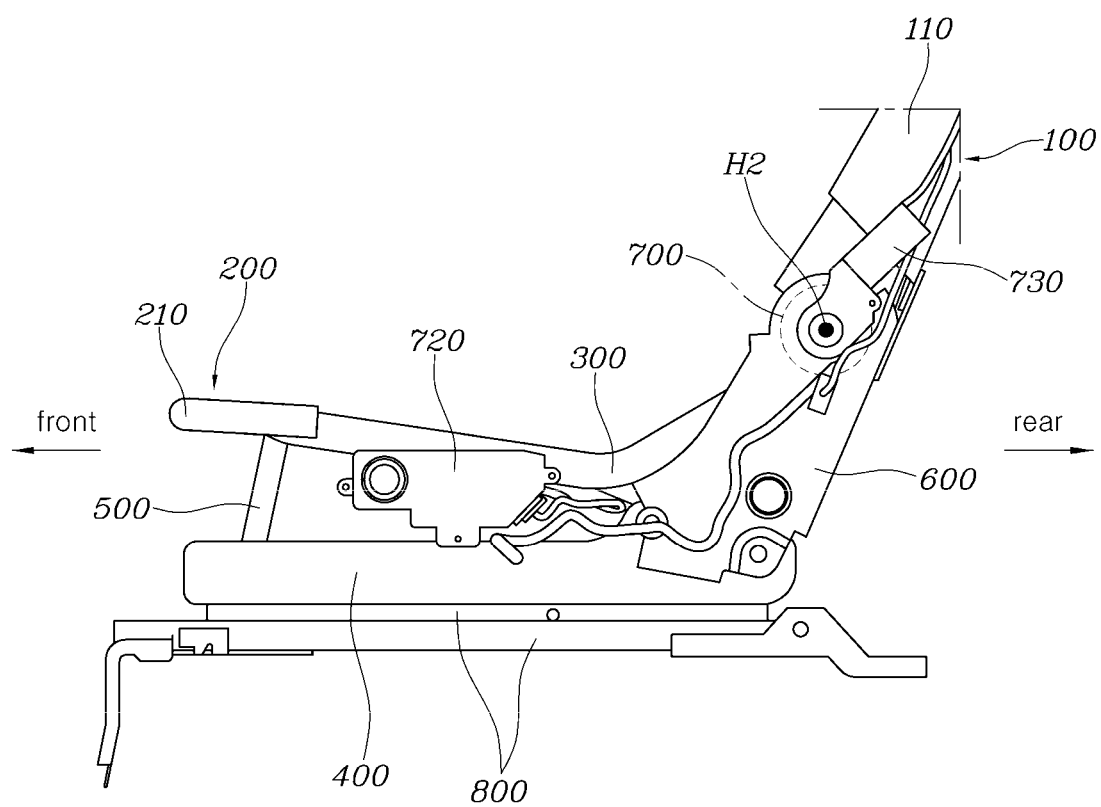
FIG. 5 is a side view of the seat illustrating a power switch and a motor coupled to the seat, according to an exemplary embodiment of the present disclosure.

The seatback 1 including the seatback side frame 110 may be rotated forwards and backwards by the operation of the recliner 700, and the recliner hinge point H2 may correspond to a central portion of the recliner 700. The recliner 700 may be operated by manipulating a recliner lever 710 as shown in FIG. 4, or may be operated with the power of a motor 730 by manipulating a power switch 720 as shown in FIG. 5.

The cushion fixing bracket 400 according to the present disclosure is coupled to a seat rail 800. The seat rail 800 includes a fixed rail that extends in a front-rear direction and is fixedly coupled to a vehicle floor, and a moving rail that is coupled to the fixed rail and is moved forwards and backwards along the fixed rail. The cushion fixing bracket 400 is coupled to the moving rail constituting the seat rail.

The seat according to the present disclosure further includes a seat cushion rear pipe 220 that is located behind the seat cushion front pipe 210 and is coupled at both ends thereof to the back cushion interlocking frame 300, a suspension pipe 230 that is located between the seat cushion front pipe 210 and the seat cushion rear pipe 220 and is integrally coupled at both ends thereof to the front end of the back cushion interlocking frame 300 and an end of the seat cushion front pipe 210, and a plurality of suspensions 240 that connects the seat cushion rear pipe 220 and the suspension pipe 230.

The suspension 240 may be a zigzag-shaped wire spring that extends in the front-rear direction and protrudes laterally.

The seat-cushion frame 200 includes the seat cushion front pipe 210, the seat cushion rear pipe 220, the suspension pipe 230, and the plurality of suspensions 240.

Figure 6:
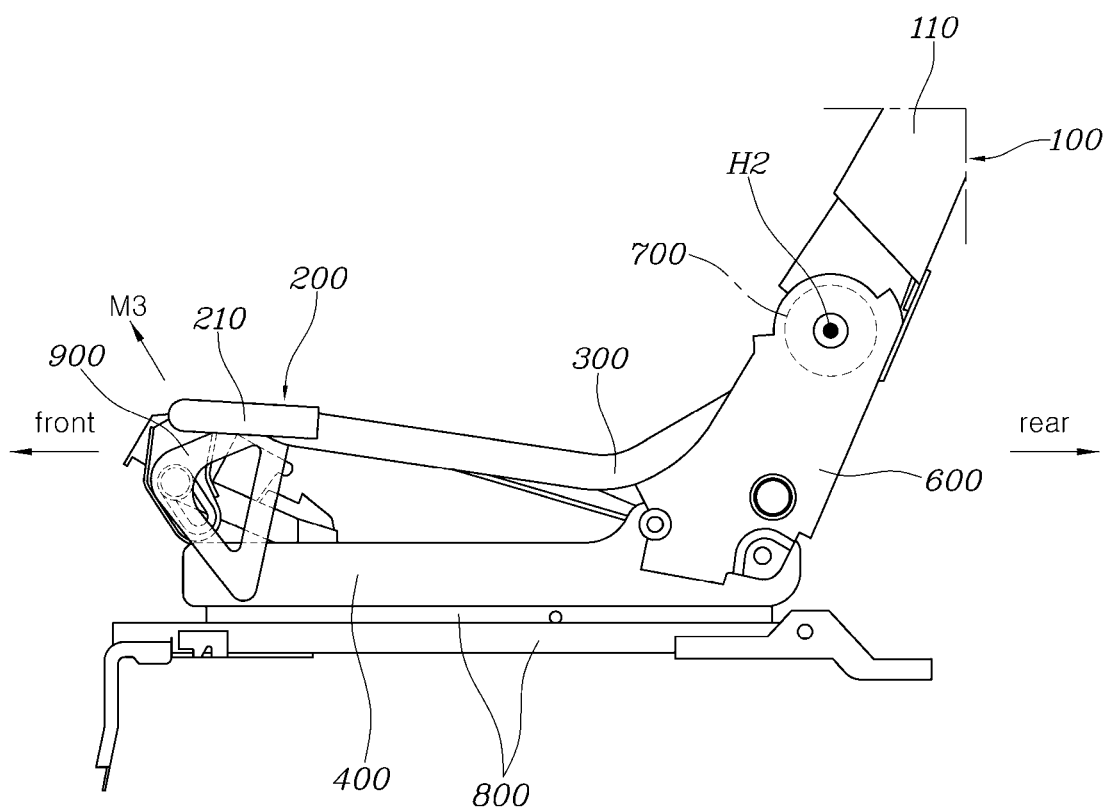
FIG. 6 is a side view illustrating a tilt mechanism coupled to the seat, according to an exemplary embodiment of the present disclosure.

Furthermore, the seat according to the present disclosure further includes a tilt mechanism 900 installed to connect a front portion of the seat cushion front pipe 210 and the cushion fixing bracket 400. When the tilt mechanism 900 is operated, the seat cushion front pipe 210 is lifted upwards (arrow M3 of FIG. 6), and thereby the seat may realize the relax mode.

The tilt mechanism 900 is a device that may move the front end of the seat cushion 2 up and down. If necessary, the tilt mechanism may include a motor, a lead screw, a bracket on which a guide is formed, etc.

As described above, a seat for a vehicle having a fold-and-dive function according to the present disclosure is advantageous in that a seat cushion 2 is moved down when a seatback 1 is rotated forwards and folded, so the fold-and-dive function of the seat is realized, and a rear end of the seat cushion 2 is moved up in a reclining operation where the seatback 1 is rotated backwards, and a step C1 between the seat cushion 2 and the seatback 1 can be significantly reduced or eliminated as a rear end of the seat cushion 2 is moved upwards, so a full-flat mode of the seat can be realized, and thereby a passenger can take a more comfortable rest while lying down.

Furthermore, an embodiment of the present disclosure is advantageous in that a front link 500 connecting a back cushion interlocking frame 300 and a cushion fixing bracket 400 to perform a fold-and-dive function is installed to have directivity where it is inclined rearwards, thus preventing a submarine phenomenon of the seat in the event of a forward collision, and thereby more effectively protecting the safety of a passenger.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A seat for a vehicle having a fold-and-dive function, comprising:
  a back cushion interlocking frame rotatably coupled at a front end and a rear end thereof to a seat cushion front pipe and a seatback side frame, respectively; and
  a front link rotatably coupled at a front end and a rear end thereof to a front end of the back cushion interlocking frame and a cushion fixing bracket,
  wherein a hinge joint point at which the seatback side frame and the back cushion interlocking frame are coupled is located under a recliner hinge point that is a rotation center of the seatback side frame.

2. The seat of claim 1, wherein, when the seatback side frame rotates forwards and backwards about the recliner hinge point, the back cushion interlocking frame is moved in a direction opposite to an upper end of the seatback side frame.

3. The seat of claim 1, wherein, when the back cushion interlocking frame is moved by rotating the seatback side frame, the front link rotates about a lower-end hinge point coupled to the cushion fixing bracket such that an upper-end hinge point coupled to the back cushion interlocking frame moves in the same direction as the back cushion interlocking frame.

4. The seat of claim 1, wherein the front link is installed to have directivity in which an upper end thereof coupled to the back cushion interlocking frame is located behind a lower end thereof coupled to the cushion fixing bracket and thereby the front link is inclined rearwards.

5. The seat of claim 1, wherein the front link is installed to have directivity in which the front link is inclined rearwards, thus preventing a submarine phenomenon of the seat in the event of a forward collision.

6. The seat of claim 1, wherein the front link is installed to have directivity in which an upper end thereof coupled to the back cushion interlocking frame is located in front of a lower end thereof coupled to the cushion fixing bracket and thereby the front link is inclined forwards.

7. The seat of claim 1, wherein, when the seatback side frame rotates forwards about the recliner hinge point and thereby the seatback is folded, the rear end of the back cushion interlocking frame coupled to the seatback side frame and the front end of the back cushion interlocking frame coupled to an upper end of the front link are moved backwards and downwards, and when the back cushion interlocking frame is moved, the front link is rotated to be inclined rearwards, thus realizing the fold-and-dive function.

8. The seat of claim 1, wherein, when the seatback side frame rotates rearwards about the recliner hinge point and thereby the seatback is folded, the hinge joint point at which the seatback side frame and the back cushion interlocking frame are coupled is rotated about the recliner hinge point to move upwards, when the hinge joint point rotates, the rear end of the back cushion interlocking frame is moved to be lifted upwards, and when a full-flat mode of the seat is implemented by upwardly moving the rear end of the back cushion interlocking frame, a step between the seat cushion and the seatback can be reduced.

9. The seat of claim 1, further comprising:
a recliner base bracket installed to connect a lower end of the seatback side frame and a rear portion of the cushion fixing bracket, and
wherein a recliner having the recliner hinge point is installed to be located at a portion where the seatback side frame and the recliner base bracket overlap each other.

10. The seat of claim 1, wherein the cushion fixing bracket is coupled to a seat rail.

11. The seat of claim 1, further comprising:
a seat cushion rear pipe located behind the seat cushion front pipe and coupled at both ends thereof to the back cushion interlocking frame;
a suspension pipe located between the seat cushion front pipe and the seat cushion rear pipe, and integrally coupled at both ends thereof to a front end of the back cushion interlocking frame and an end of the seat cushion front pipe; and
a plurality of suspensions connecting the seat cushion rear pipe and the suspension pipe.

12. The seat of claim 1, further comprising:
a recliner operated to forwardly and backwardly rotate the seatback side frame about the recliner hinge point, and
wherein the recliner is operated by manipulating a recliner lever, or is operated with power of a motor by manipulating a power switch.

13. The seat of claim 1, further comprising:
a tilt mechanism installed to connect the seat cushion front pipe and the cushion fixing bracket,
wherein, when the tilt mechanism is operated, the seat cushion front pipe is moved to be lifted upwards, and thereby a relax mode is realized.

* * * * *